United States Patent Office 3,564,360
Patented Feb. 16, 1971

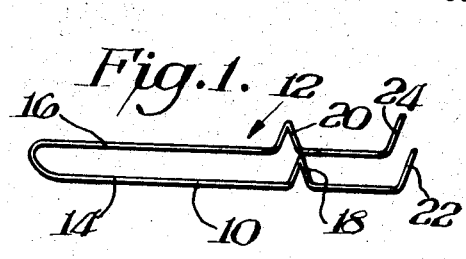
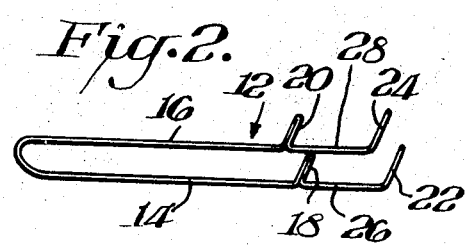
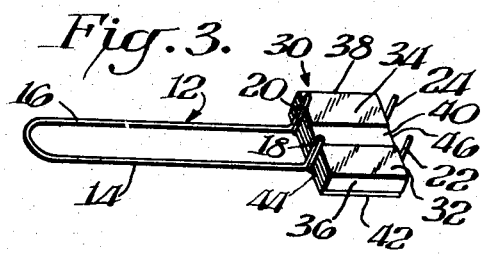
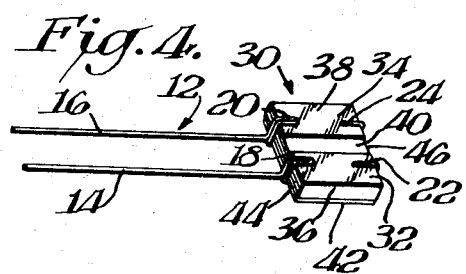
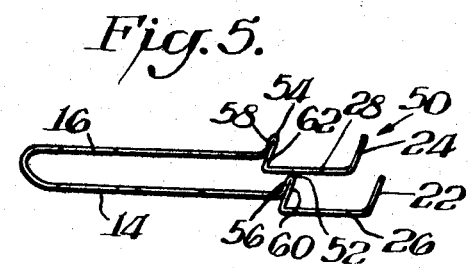
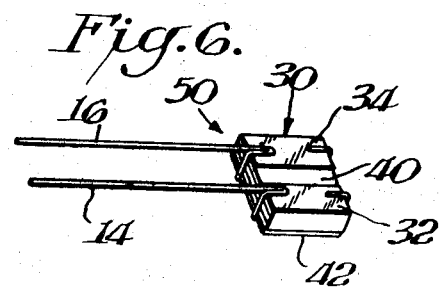

3,564,360
STACKED CAPACITOR
Roger W. Zimmerman, West Bend, Wis., assignor to Sprague Electric Company, North Adams, Mass., a corporation of Massachusetts
Filed June 4, 1969, Ser. No. 830,333
Int. Cl. H01g 1/14
U.S. Cl. 317—261                                      6 Claims

ABSTRACT OF THE DISCLOSURE

An integral wireform disposed in clamping engagement with a stacked capacitor has a pleat-like portion bent around a first edge of the stack with one end extended from the stack as a radial leadwire. A connective portion of the wireform extends across a major surface of the stack from the pleat-like portion to another end portion which is bent into clamping engagement around the opposing edge of the stack.

BACKGROUND OF THE INVENTION

This invention relates to a stacked capacitor and more particularly to a stacked capacitor having an integral clamp and leadwire.

Stacked electrical capacitors generally utilize relatively expensive two piece clamp and leadwire assemblies. Integral clamp and leadwire assemblies are also employed, however, these often provide inadequate clamping and leads having low pull strength.

It is an object of this invention to provide a stacked capacitor having an economical clamp and leadwire arrangement.

It is another object of this invention to provide an integral clamp and leadwire arrangement in which the wireform is folded around opposing edges of a stack capacitor and is radially extended as a leadwire.

These and other objects tf this invention will be apparent upon consideration of the following specification and claims taken in conjunction with the drawing.

SUMMARY OF THE INVENTION

Broadly, a stacked capacitor provided in accordance with the invention comprises a plurality of alternate layers of conductive electrode and dielectric materials disposed in a stack with conductive means for extending said electrodes to at least an edge portion of the stack, at least one integral wireform having a folded portion disposed in clamping engagement with said stack and in contact with one of said conductive means and an end portion extending from said stack for providing a leadwire, said folded portion having an intermediate portion in connection to said leadwire and folded around a first edge of said stack, said folded portion having another end portion folded around the opposite edge of said stack, and said folded portion having a connective portion extending between said intermediate portion and said other end portion.

BRIEF DESCRIPTION OF THE DRAWING

FIG. 1 is a view in perspective of a wireform showing a first stage in the formation of a combined pair of clamp and leadwire assemblies;

FIG. 2 is a view in perspective of a wireform pair showing a second stage in its construction;

FIG. 3 is a view in perspective illustrating assembly of the wireform pair to a stacked capacitor;

FIG. 4 is a view in perspective of the completed capacitor;

FIG. 5 is a view in perspective of another embodiment of the invention; and

FIG. 6 is a view in perspective of a completed capacitor utilizing the wireform embodiment of FIG. 5.

DESCRIPTION OF THE PREFERRED EMBODIMENT

As shown in FIG. 1, a wire 10 of tinned copper or brass, or the like is first formed in a U-shaped arrangement 12 having a pair of legs 14 and 16. Each leg 14 and 16 is formed with intermediate portions 18, 20 and end portions 22, 24 bent upward from the plane of the U-shaped form 12.

Intermediate portions 18 and 20 are first formed as triangular portions which are then closed into plate-like or pleat-like uprights as shown in FIG. 2, such that legs 14, 16 each provide a pair of upright elements spaced according to the width of the capacitor stack for which it is designed. Hence, uprights 18 and 22 of leg 14 are spaced apart by a connective portion 26 whereas uprights 20 and 24 of leg 16 are spaced by connective portion 28.

In the next step as shown in FIG. 3, a capacitor stack 30 is positioned on the connective or support portions 26, 28 between uprights 18, 22, and 22, 24. Capacitor 30 is a conventional stacked capacitor of mica or the like which is constructed, for example, with alternate layers of conductive and insulative material such as a plurality of silver coated mica layers. Conductive means 32, 34 such as metal foils or the like are provided in contact with alternate electrodes and extended from alternate electrodes to opposite ends 36, 38 of a major surface 40 of stack 30 so as to provide external contact areas for connection to one of the wireform clamps. Hence, foil 32 extends from end 36 to the upper surface 40 while foil 34 extends from end 38.

Alternatively, foils 32, 34 could be brought to bottom surface 42 for contact with connective portions 26 and 28 of the wireforms, or the foils may extend to both upper and lower surfaces. The foils may also be extended at the lateral edges 44 and 46 of the stack in the vicinity of the uprights for contact with the wireforms at these points. Finally, the stack is bonded together in a conventional manner, as for example by coating component parts with varnish or the like and then applying heat and pressure to the stack.

The component is completed by forming the uprights of each leg around lateral edges 44, 46 of stack 30. For example, uprights 18 and 22 are bent towards each other and downward against the upper major surface 40. This tightly clamps stack 30 between the downwardly formed portions and the underlying support portions 26 and 28 which extend across the lower major surface 42. Thereafter, at an appropriate time prior to end use, legs 14, 16 are severed near the U-shaped bend to provide extended terminal leadwires, as shown.

Each wireform provides an extended terminal leadwire in clamping connection to the stack. Each wireform clamps opposing edges of the stack with a connective wire extending laterally across one major surface of the unit between clamping portions so as to provide highly reliable lead contact and good lead pull strength inasmuch as the wireforms entrap the unit rather than only a single edge.

The novel wireform provides an economical lead and clamp arrangement. As can be seen from the drawings, the pleat-like uprights 18, 20 and end uprights 22, 24 are formed substantially normal to leadwires 14, 16 and connective portions 26, 28 and define a single plane. In this case, leadwires 14, 16 are axially aligned with support portions 26, 28 respectively and extend from the lower surface 42 of stack 40.

In another embodiment, as shown in FIG. 5, leadwire portions 14 and 16 are formed at a height above connective portions 26, 28 such that upon connection to the capacitor, as shown in FIG. 6, leadwires 14, 16 extend from the upper stack surface 40 instead of lower surface 42.

In this case, the wireform 50 is constructed similar to that of the preferred embodiment, with however, short legs 56, 58 provided for the leadwire side of pleat-like uprights 52, 54. The length of this short leg is such that leadwires 14, 16 are positioned above connective portions 26, 28 at a height or distance equal to the stack thickness. Hence, long legs 60, 62 of the pleated uprights exceed short legs 56, 58 by stack thickness such that upon assembly to the capacitor, short legs 56, 58 are straightened to become axially aligned with leads 14 and 16.

Advantageously, wireform 50 provides increased lead pull strength, since lead pull is parallel to the pleats, however this construction requires a custom design for different stack thickness.

Advantageously, many different capacitor structures may be utilized with the described wireform arrangement and, of course, the wireform may be formed or assembled as separate elements rather than in the illustrated U-shape. Thus it should be understood that many different embodiments are possible and the invention is not to be limited except as in the appended claims.

I claim:
1. A stacked capacitor comprising a plurality of alternate layers of conductive electrodes and dielectric materials disposed in a stack arrangement with a pair of conductive means for extending alternate electrodes to spaced apart portions of the surface of said stack, and at least one wireform of a single length of wire, one end of which is disposed in clamping engagement with said stack and in contact with one of said conductive means wherein the clamping portion consists of two formed and spaced apart uprights in engagement with two opposing lateral edges of said stack with that part of said wireform connecting the formed uprights extending across one surface of said stack in substantially parallel relation to the other two edges of said stack and with the ends of the formed uprights bent into clamping engagement with the other surface of said stack and wherein the other end of said wireform extends away from said stack in a line substantially parallel to that part of said wireform connecting the formed uprights, thereby providing a radial leadwire.

2. The capacitor of claim 1 wherein said formed upright closer to said leadwire is a pleated bend of said wireform.

3. The capacitor of claim 1 wherein said leadwire is substantially aligned with said connective portion and extends in a substantially perpendicular relation to said first edge.

4. The capacitor of claim 1 wherein said leadwire extends in the plane of the surface of said stack into which the formed uprights are bent.

5. The capacitor of claim 1 including a pair of spaced apart parallel wireforms disposed in clamping engagement at opposite ends of said stack, and said pair of conductive means extend to opposite ends of the surface of said stack so as to contact a respective wireform.

6. The capacitor of claim 5 wherein said pair of wireforms is an integral unit having the leadwires joined together at their extended ends.

References Cited
UNITED STATES PATENTS
| | | | |
|---|---|---|---|
| 3,241,014 | 3/1966 | Rubinstein | 317—261X |
| 3,431,473 | 3/1969 | Cormier | 317—261X |

FOREIGN PATENTS
| | | | |
|---|---|---|---|
| 410,768 | 4/1934 | Great Britain | 30—261 |

E. A. GOLDBERG, Primary Examiner